(12) United States Patent
Zielke et al.

(10) Patent No.: US 10,839,713 B2
(45) Date of Patent: Nov. 17, 2020

(54) INDIVIDUAL NYSTAGMUS SIMULATED TRAINING EXPERIENCE

(71) Applicants: University of Texas at Dallas, Richardson, TX (US); Sam Houston State University, Huntsville, TX (US); Eye T Plus, LLC, Rockwall, TX (US)

(72) Inventors: Marjorie A. Zielke, Southlake, TX (US); Michael Kaiser, Dallas, TX (US); Timothy Lewis, Rowlette, TX (US); Christopher Gonzales, Rockwall, TX (US); Cecelia Marquart, Huntsville, TX (US); John F. Kay, Greenville, TX (US); Gary Hardee, Grand Prairie, TX (US); Matthew Dusek, Dallas, TX (US); Kenneth Authier, Waxahachie, TX (US)

(73) Assignees: The University of Texas System, Austin, TX (US); Sam Houston State University, Huntsville, TX (US); Eye T. Plus, LLC, Rockwall, TX (US)

( * ) Notice: Subject to any disclaimer, the term of this patent is extended or adjusted under 35 U.S.C. 154(b) by 348 days.

(21) Appl. No.: 15/632,511

(22) Filed: Jun. 26, 2017

(65) Prior Publication Data

US 2017/0372633 A1 Dec. 28, 2017

Related U.S. Application Data

(60) Provisional application No. 62/354,504, filed on Jun. 24, 2016.

(51) Int. Cl.
*G09B 19/00* (2006.01)
*G09B 5/02* (2006.01)

(52) U.S. Cl.
CPC .............. *G09B 19/00* (2013.01); *G09B 5/02* (2013.01)

(58) Field of Classification Search
CPC ...................................................... G09B 19/00
USPC ........................................................ 434/219
See application file for complete search history.

*Primary Examiner* — Kesha Frisby
(74) *Attorney, Agent, or Firm* — Kowert, Hood, Munyon Rankin & Goetzel, P.C.; Mark R. DeLuca

(57) ABSTRACT

A training system includes a computer system, a display system and a motion capture device. During use the training system presents a computer simulation of a virtual subject capable of exhibiting nystagmus to a trainee. The movements of the trainee are captured using the computer system during the administration of an HGN test to the virtual subject. During the administration of the HGN test to the virtual subject, the training system simulates nystagmus in the virtual subject.

16 Claims, 1 Drawing Sheet

INDIVIDUAL NYSTAGMUS SIMULATED TRAINING EXPERIENCE

PRIORITY CLAIM

This application claims priority to U.S. Provisional Application Ser. No. 62/354,504 entitled "INDIVIDUAL NYSTAGMUS SIMULATED TRAINING EXPERIENCE" filed Jun. 24, 2016, which is incorporated herein by reference in its entirety.

BACKGROUND OF THE INVENTION

1. Field of the Invention

The invention generally relates to computer simulations which interact with users. More particularly, the invention relates to a computer simulation to supplement training of law enforcement officers and cadets in administering the horizontal gaze nystagmus test.

2. Description of the Relevant Art

Nystagmus is the technical term for involuntary jerking or bouncing of the eyeball. Nystagmus occurs when there is an irregularity in the inner ear system or a problem affecting the oculomotor control of the eye. A horizontal gaze nystagmus is a lateral or horizontal jerking movement when a person looks toward the side.

Nystagmus and horizontal gaze nystagmus can be traced to several different sources, including alcohol use and the consumption of other drugs that depress the central nervous system, such as inhalants or phencyclidine. These drugs hinder the brain's ability to properly control the eye muscles. The presence of alcohol or such drugs in the body's system results in jerking or bouncing movements in the eyeball. The higher a person's blood alcohol content level, the more obvious the nystagmus becomes.

The horizontal gaze nystagmus ("HGN") is one of the three standardized field sobriety tests developed by the National Highway Traffic and Safety Administration to identify possible drunk drivers. Research has proven that this test is the most accurate of the three, with a 77% accuracy rating in detecting blood alcohol content levels of 0.10 or higher. In the horizontal gaze nystagmus test used by law enforcement officials, the officer positions an object, usually a pen or a finger, about one foot from the driver's face and then moves the object from one side to another while observing the driver's eye movements. During the observation, the officer tries to estimate the angle at which the jerking movements begin. Jerking movements in the eye before the gaze reaches a 45-degree angle is indicative of a possible blood alcohol content level over 0.05. The officer also checks the eye's stability when the gaze is as far to the side as it can go.

Even though this test has proved quite accurate and is widely used by law enforcement in assessing a person's blood alcohol content, many lawyers still try to challenge its credibility in court. One of the main complaints is that the officers who administer the test are not medically trained. Therefore, their ability to assess the angle at which nystagmus begins is often questioned. There is a need, therefore, to be able to properly train police officials to be able to administer an HGN test.

SUMMARY OF THE INVENTION

A method of simulating a horizontal gaze nystagmus (HGN) test, includes: presenting a computer simulation, using a computer system, of a virtual subject capable of exhibiting nystagmus to a trainee; capturing the movements of the trainee using the computer system during the administration of a HGN test to the virtual subject; and simulating nystagmus in the virtual subject using the computer system during the administration of the HGN test to the virtual subject. In an embodiment, the computer simulation is presented on a display screen of a computer system.

In some embodiment, the method further comprises customizing the virtual subject by changing eye parameters of the virtual subject. Eye parameters include, but are not limited to, eye redness, eye wetness, pupil size, and pupil dissimilarity. Eye parameters may also include amount of eye jerking and angle at which the onset of nystagmus occurs.

The virtual subject may be a simulation of a person having a blood alcohol content of between 0 and 0.3. The virtual subject may be a simulation of a person under the influence of an illegal drug.

Capturing the movements of the trainee may be performed using a motion capture device coupled to the computer system. In an embodiment, the motion capture device is mounted at about an eye level of the virtual subject. In an embodiment, the motion capture device tracks the movement of an object presented by the trainee to the virtual subject. In an embodiment, the eyes of the virtual subject track the motion of the stimulus presented by the trainee to the virtual subject during the administration of a HGN test to the virtual subject.

In an embodiment, the method also includes providing feedback parameters to the trainee during administration of a HGN test to the virtual subject. The feedback parameters may be displayed on the display screen which presents the virtual subject to the trainee. The feedback parameters include, but are not limited to, the translational speed of the trainee's stimulus; the distance from the virtual subject eyes to the trainee's stimulus; and the angle of the virtual subject's eyes to the trainee's stimulus.

In an embodiment, the method further includes testing the ability of a trainee to administer an HGN test to a virtual subject, wherein no feedback information is provided during the testing. In an embodiment, after the HGN test is administered to the virtual subject by the trainee, the trainee is asked to indicate if an arrest of the virtual subject should be made.

Embodiments also relate to systems for performing the method. In an embodiment, a system for simulating a horizontal gaze nystagmus (HGN) test, comprising: a computer system comprising a processor and a memory coupled to the processor; and a motion capture device coupled to the computer system, wherein the motion capture device configured to capture movements of a trainee; wherein the memory comprises program instructions executable by the processor to implement: presenting a computer simulation of a virtual subject capable of exhibiting nystagmus to a trainee on a display screen of the computer system; capturing the movements of the trainee using the computer system during the administration of a HGN test to the virtual subject; and simulating nystagmus in the virtual subject using the computer system if the trainee properly administers the HGN test. In an embodiment, the computer screen is mounted such that the middle of the computer screen is at a height of between about 4 feet to about 6 feet from the ground.

The method, in some embodiments, may be embodied in a non-transitory, computer-readable storage medium comprising program instructions stored thereon.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
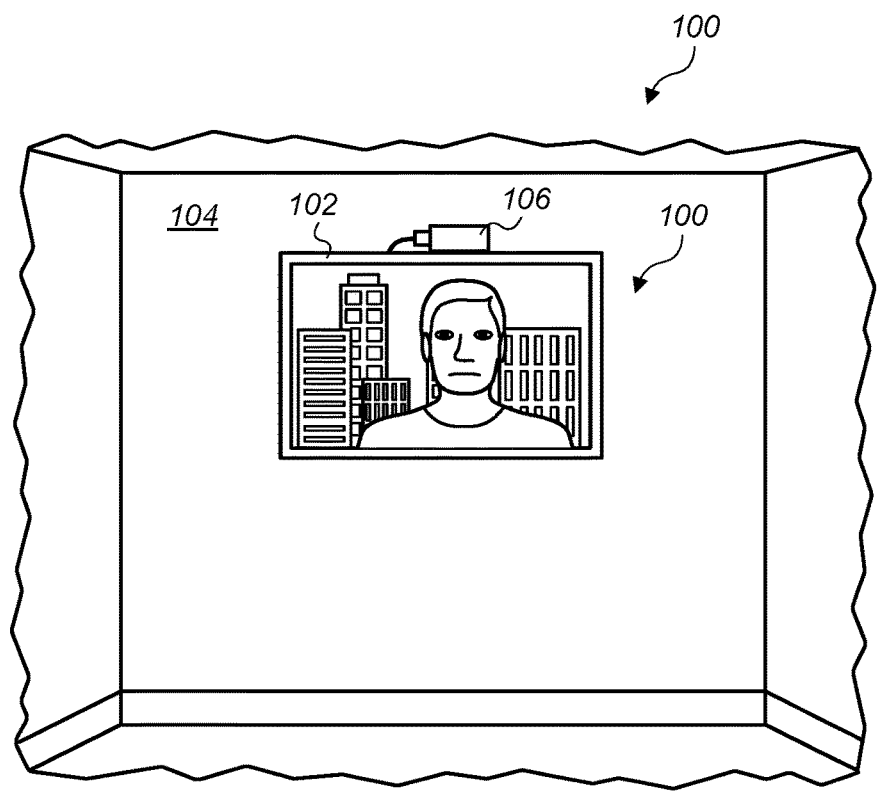
FIG. 1 depicts a wall mounted computer screen for presenting a virtual subject to a trainee.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

In an embodiment, a method of simulating a horizontal gaze nystagmus (HGN) test, includes presenting a computer simulation of a virtual subject capable of exhibiting nystagmus to a trainee; capturing the movements of the trainee using the computer system during the administration of a HGN test to the virtual subject; and simulating nystagmus in the virtual subject using the computer system during the administration of the HGN test to the virtual subject.

As used herein the term "computer simulation" encompasses a simulation presented on a display screen, as a virtual reality simulation, an augmented reality simulation, or a robotic simulation. Preferably, the virtual subject is represented by a high definition subject. The resolution of the virtual subject should be such that the virtual subject is capable of exhibiting visibly discernable nystagmus.

Nystagmus is a term to describe fast, uncontrollable movements of the eyes. The uncontrolled movements may be side to side (horizontal nystagmus); up and down (vertical nystagmus); or rotary (rotary or torsional nystagmus). When someone is intoxicated by alcohol and/or certain drugs, these uncontrolled movements become more pronounced. A horizontal gaze nystagmus test is the easiest and most reliable test to use if a person is suspected of being intoxicated. To administer the test, a police officer will hold a small object approximately 12-15 inches from the subject slowly move it from one side to the other. The subject will be instructed to follow the object with their eyes while keeping their head still. During administration of the test, the officer will look for clues of pronounced horizontal nystagmus. The primary clue for intoxication is that nystagmus sets in before the eyes reach a 45 degree angle. Another test is that at maximum deviation (as far as the subject eyes can go and still see the object) the eyes begin jerking within four seconds.

In order to better accommodate varying training requirements, the training system was designed and developed to allow experts in this field, such as Drug Recognition Experts (DRE), to customize the virtual subject in a variety of ways. The eye parameters of the virtual subject can be customized to mimic the eye movements of a real person. Eye parameters include the eye movements of the virtual subject and the eye characteristics of the subject. Eye movements include, but are not limited to, amount of eye jerking and angle at which the onset of nystagmus occurs. Eye characteristics include, but are not limited to, eye redness, eye wetness, pupil size, and pupil dissimilarity. A set of eye parameters may be stored into profiles that can be used immediately, or saved for use at a later time. By adjusting the eye parameters, experts can construct scenarios with varying levels of blood alcohol content (BAC), as well as conditions that are not seen as often (e.g., pupil dissimilarity).

In an embodiment, the virtual subject presented to a trainee is capable of being customized for each training session. Specifically, prior to training or testing the trainee, an input screen may be presented on the system which includes menus and/or icons that allow one or more eye parameters to be changed by the operator of the training system. Alternatively, menus and/or icons may be presented to an operator of the training system that allows the user to pick a particular type of profile for the virtual subject. For example, the input screen may allow the operator to select a virtual subject with a blood alcohol content of 0.08 and eye redness. The input system allows a variety of eye parameters to be easily selected to allow diverse testing of the trainee.

In an embodiment, the training system is used to teach a trainee how to properly administer and interpret an HGN test on a virtual subject. When the trainee is a police officer or cadet, the training system is capable of presenting various subjects having a blood alcohol content of between 0 to about 0.3, of between 0 and 0.25, of between 0 and 0.2, or between 0 and 0.15. Thus, the training system will help train the police officer or cadet to properly administer and interpret an HGN test. The training system is particularly useful because it can present both legally intoxicated (e.g., blood alcohol content of 0.08 or higher) and legally sober (blood alcohol content below 0.08) virtual subjects to the trainee.

In addition to alcohol, all of the major drugs of abuse, including cocaine, marijuana, amphetamine, phencyclidine, can produce typical eye signs that can be easily detected by a rapid eye test. These signs include ptosis, abnormal pupil size, nonreactivity of the pupil to a light challenge, nystagmus, non-convergence and eyelid tremors. In an embodiment, the virtual subject may also be capable of exhibiting eye signs that are commensurate with the behavior of a human subject under the influence of drugs and/or under alcohol.

The training system may, in its simplest form, include a computer system, a display system coupled to the computer system and a motion capture device coupled to the computer system. The term "computer system," as used herein, refers to any device having a processor that executes instructions from a memory medium. Computer systems may further include an alphanumeric input device such as keyboard, and a directional input device such as mouse. Examples of computer systems include but are not limited to desktop computers, laptop computers, tablet computers, mobile phones, digital media players, game consoles, digital wristwatches, head-mounted display systems, digital televisions, set-top boxes and file servers. Computer systems may be operable to execute the computer programs to implement computer-implemented systems and methods.

A computer system may allow access to participants by way of any browser or operating system. Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), "smart phone", television system or other device.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

The term "display system," as used herein, may be any display device that is capable of providing a visual image of a virtual subject to the trainee. Examples of display devices include, but are not limited to, a thin panel display (e.g., an LCD screen), a virtual reality display device, and an augmented display device. In some instances that computer system and display system are integrated together (e.g., a tablet computer, smart phone, smart TV, etc.)

The motion capture device is a device capable of capturing the movements of an object by the trainee. As used herein the term "object" refers to anything that can be used to focus the gaze of a human subject and allow the subject's gaze to follow the object. An object can include objects that are held by the trainee (e.g., a pen, pencil, cell phone, etc.). An "object" may also include body parts of the trainee (e.g., the trainee's finger).

Typical motion capture devices include, but are not limited to, optical motion capture devices, inertial motion capture devices, and motion capture devices that rely on sensors (motion sensors or optical sensors). An exemplary optical motion capture device is a Leap Motion Controller (sold by Leap Motion, Inc., San Francisco, Calif.). The motion capture device is capable of capturing the movement of an object, or body part, and translates that movement into computer readable signals. The motion capture device may capture the relative distance from the motion capture device to the detected object. The motion capture device may also capture the speed of the object and the angle of the object with respect to a central axis of the motion capture device.

To more accurately correlate the movement of the object with respect to the virtual subject, the motion detector may be mounted at or near the eye level of the virtual subject. The computer system may be capable of compensating for any differences between the position of the motion detector and the position of the eyes of the virtual subject.

An embodiment of a training system 100 is presented in FIG. 1. A display system 102 (e.g., an LCD monitor) coupled to a computer system (not shown or incorporated into the display system) may be mounted on a wall 104. A motion capture device 106 may be mounted to display system 102 or wall 104 at or about the eye level of the virtual subject. The virtual subject may be displayed with background scenery (e.g., such as a roadway/car in the background) to convey or more realistic of a field situation. Alternatively, only the virtual subject may be displayed on the display screen.

Figure 2:
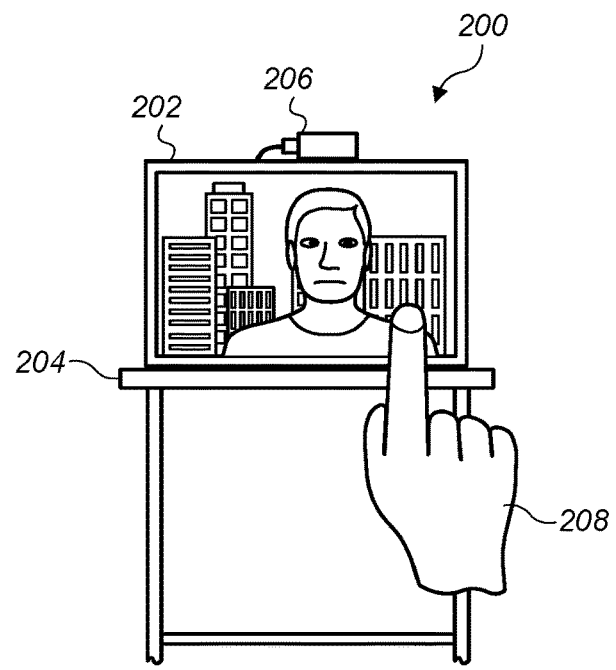
FIG. 2 depicts a computer screen on a stand for presenting a virtual subject to a trainee.

An alternate embodiment of a training system 200 is presented in FIG. 2. A display system 202 (e.g., an LCD monitor) coupled to a computer system (not shown or incorporated into the display system) may be mounted on a stand 204. A motion capture device 206 may be mounted to display system 102 or wall 104 at or about the eye level of the virtual subject.

In either embodiment, a trainee may stand in front of the display screen (102/202) and administer an HGN test to the virtual subject displayed on the display screen. The trainee may hold an object 208 in front of the virtual subject and move the object in a manner consistent with the administration of an HGN test to a person. The translational data captured by the motion captured device is streamed to the computer system, in real-time. The computer, in response to the motion of the trainee, allows the virtual subject's eyes to realistically track the object. Depending on the preferences set prior to the test, the virtual subject will manifest nystagmus, as well as other eye conditions, to the trainee.

The training system may include two operational modes: Testing and Practice. The practice mode provides feedback to the user during the administration of an HGN test. Feedback parameters may be displayed to the user through the display system. Feedback parameters that may be presented to the trainee during Practice mode include, but are not limited to: translational speed of the trainee's stimulus; the distance from the virtual subject eyes to the trainee's stimulus; and the angle of the virtual subject's eyes to the trainee's stimulus. The feedback parameters may be displayed anywhere on the display screen, but are preferably displayed near the subjects head or eyes, since the trainee will be studying the virtual subjects eyes during testing.

To assist learners in identifying BAC levels, the computer system includes software developed to accurately simulate the angle of onset of nystagmus, which is a reflection of BAC levels. The computer system uses the motion capture device sensing capabilities to calculate the exact angle of the virtual character's eyes as it follows an object used by the trainee during the HGN test. The system may also monitor the distance of the object from motion detection device. If the object is held too close or too far from the virtual subject, the virtual subject may fail to provide an appropriate response. If the object is properly presented to the virtual subject at (e.g., at a distance of about 12-15 inches from the virtual character's eyes), the nystagmus animation begins based on the angle, or BAC level, set by the user. This accurately simulates what occurs in real-life when an impaired driver attempts to follow the properly performed motion of an HGN test. Eye animations have been developed to present the lifelike jerking motion that occurs with nystagmus, as well as dilation of pupils.

During the testing mode, the trainee performs the HGN test on the virtual subject without the specialized feedback provided during practice. Before the trainee begins the HGN test, the trainee may be asked some questions to determine if they believe an HGN test is necessary. If the trainee opts not to perform the HGN test, the trainee may be prompted to provide a reason why they chose to not perform the HGN test. This functionality also allows the trainee to be taught about certain medical conditions that rule-out the use of the HGN test as a means of evaluation. After the trainee completes their assessment of the virtual subject, they are able to specify if they believe the subject should be arrested, based on the local rules regarding legal intoxication.

The computer system has the capability to track, store and output various data produced by the user. During both Practice and Testing modes, the computer system stores data about the duration of users' sessions as well as the position of their object over time for each practice of testing session. In Testing Mode, answers to assessment questions are tracked and stored so that they can be reviewed or graded.

In some embodiments, the software may be stored on a non-transitory, computer-readable storage medium comprising program instructions stored thereon, wherein the program instructions are configured to implement the Practice and Testing modes.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of simulating a horizontal gaze nystagmus (HGN) test, comprising:
   receiving, by a computer system, a selection of one or more parameters for the HGN test;
   providing, by the computer system, a computer simulation of the HGN test to a trainee, including by:
      presenting, via a display device, a virtual subject that is capable of exhibiting simulated nystagmus;
      receiving, via a motion capture device, input indicative of movement of an object by the trainee;
      based on the movement of the object by the trainee, modifying a depiction of the virtual subject on the display device; and
      simulating nystagmus in the virtual subject based on at least one of the one or more parameters.

2. The method of claim 1, further comprising customizing the virtual subject by changing eye parameters of the virtual subject.

3. The method of claim 2, wherein the eye parameters are selected from the group consisting of eye redness, eye wetness, pupil size, and pupil dissimilarity.

4. The method of claim 2, wherein the eye parameters are selected from the group consisting of amount of eye jerking and angle at which the onset of nystagmus occurs.

5. The method of claim 1, wherein the virtual subject is a simulation of a person having a blood alcohol content of between 0 and 0.3.

6. The method of claim 1, wherein the virtual subject is a simulation of a person under the influence of an illegal drug.

7. The method of claim 1, wherein the motion capture device is mounted at about an eye level of the virtual subject.

8. The method of claim 1, wherein eyes of the virtual subject track the motion of the object presented by the trainee to the virtual subject during the administration of a HGN test to the virtual subject.

9. The method of claim 1, further comprising providing feedback parameters to the trainee during administration of a HGN test to the virtual subject.

10. The method of claim 9, wherein the feedback parameters are displayed on the display device which presents the virtual subject to the trainee.

11. The method of claim 9, wherein the feedback parameters are selected from the group consisting of: translational speed of the trainee's stimulus; the distance from the virtual subject eyes to the trainee's stimulus; and the angle of the virtual subject's eyes to the trainee's stimulus.

12. The method of claim 1, further comprising testing the ability of a trainee to administer an HGN test to a virtual subject, wherein no feedback information is provided during the testing.

13. The method of claim 12, wherein after the HGN test is administered to the virtual subject by the trainee, the trainee is asked to indicate if an arrest of the virtual subject should be made.

14. A system for simulating a horizontal gaze nystagmus (HGN) test, comprising:
   a computer system comprising a processor and a memory coupled to the processor;
   a display device coupled to the computer system; and
   a motion capture device coupled to the computer system, wherein the motion capture device is configured to capture movements of a trainee;
   wherein the memory comprises program instructions executable by the processor to implement:
      receiving, by the computer system, a selection of one or more parameters for the HGN test;
      providing, by the computer system, a computer simulation of the HGN test to a trainee, including by:
         presenting, via the display device, a virtual subject that is capable of exhibiting simulated nystagmus;
         receiving, via the motion capture device, input indicative of movement of an object by the trainee;

based on the movement of the object by the trainee, modifying a depiction of the virtual subject on the display device; and simulating nystagmus in the virtual subject based on at least one of the one or more parameters.

15. The system of claim 14, wherein the display device is mounted such that the middle of the display device is at a height of between about 4 feet to about 6 feet from the ground.

16. A non-transitory, computer-readable storage medium comprising program instructions stored thereon, wherein the program instructions are configured to implement a method of simulating a horizontal gaze nystagmus (HGN) test, comprising:

receiving, by a computer system, a selection of one or more parameters for the HGN test;

providing, by the computer system, a computer simulation of the HGN test to a trainee, including by:

presenting, via a display device, a virtual subject that is capable of exhibiting simulated nystagmus;

receiving, via a motion capture device, input indicative of movement of an object by the trainee;

based on the movement of the object by the trainee, modifying a depiction of the virtual subject on the display device; and simulating nystagmus in the virtual subject based on at least one of the one or more parameters.

\* \* \* \* \*